No. 687,232. Patented Nov. 26, 1901.
G. W. HEY.
STAMP CANCELING AND POSTMARKING MACHINE.
(Application filed May 31, 1887.)

(No Model.) 9 Sheets—Sheet 1.

Fig. 1

WITNESSES:
INVENTOR
George W. Hey
BY
Hey & Gibbs
ATTORNEYS.

No. 687,232. Patented Nov. 26, 1901.
G. W. HEY.
STAMP CANCELING AND POSTMARKING MACHINE.
(Application filed May 31, 1887.)
(No Model.) 9 Sheets—Sheet 2.

WITNESSES:

INVENTOR
George W. Hey
BY Hey & Gibbs
ATTORNEYS

No. 687,232. Patented Nov. 26, 1901.
G. W. HEY.
STAMP CANCELING AND POSTMARKING MACHINE.
(Application filed May 31, 1887.)
(No Model.) 9 Sheets—Sheet 3.

WITNESSES:
INVENTOR
George W. Hey
BY Hey & Gibbs
ATTORNEYS

No. 687,232. Patented Nov. 26, 1901.
G. W. HEY.
STAMP CANCELING AND POSTMARKING MACHINE.
(Application filed May 31, 1887.)
(No Model.) 9 Sheets—Sheet 4.

Fig. 4.

WITNESSES:
INVENTOR
George W. Hey
BY Hey & Gibbs
ATTORNEYS

No. 687,232. Patented Nov. 26, 1901.
G. W. HEY.
STAMP CANCELING AND POSTMARKING MACHINE.
(Application filed May 31, 1887.)
(No Model.) 9 Sheets—Sheet 5.

WITNESSES:
INVENTOR
George W. Hey.
BY
Hey Gibbs
ATTORNEYS.

No. 687,232. Patented Nov. 26, 1901.
G. W. HEY.
STAMP CANCELING AND POSTMARKING MACHINE.
(Application filed May 31, 1887.)
(No Model.) 9 Sheets—Sheet 6.

No. 687,232. Patented Nov. 26, 1901.
G. W. HEY.
STAMP CANCELING AND POSTMARKING MACHINE.
(Application filed May 31, 1887.)
(No Model.) 9 Sheets—Sheet 7.

Attest:
C. W. H. Brown.
A. C. Parsons.

Inventor:
George W. Hey
By Hey & Gibbs
Attorneys

No. 687,232. Patented Nov. 26, 1901.
G. W. HEY.
STAMP CANCELING AND POSTMARKING MACHINE.
(Application filed May 31, 1887.)
(No Model.) 9 Sheets—Sheet 8.

No. 687,232. Patented Nov. 26, 1901.
G. W. HEY.
STAMP CANCELING AND POSTMARKING MACHINE.
(Application filed May 31, 1887.)
(No Model.) 9 Sheets—Sheet 9.

Attest:
F. H. Schott
A. J. Birney.

Inventor
George W. Hey
by Max Fergu
Attorney

UNITED STATES PATENT OFFICE.

GEORGE W. HEY, OF SYRACUSE, NEW YORK, ASSIGNOR, BY DIRECT AND MESNE ASSIGNMENTS, TO THE INTERNATIONAL POSTAL SUPPLY COMPANY OF NEW YORK.

STAMP-CANCELING AND POSTMARKING MACHINE.

SPECIFICATION forming part of Letters Patent No. 687,232, dated November 26, 1901.

Application filed May 31, 1887. Serial No. 239,830. (No model.)

*To all whom it may concern:*

Be it known that I, GEORGE W. HEY, of Syracuse, in the county of Onondaga, in the State of New York, have invented new and useful Improvements in Stamp-Canceling and Postmarking Machines, of which the following, taken in connection with the accompanying drawings, is a full, clear, and exact description.

My invention relates to improvements in automatic stamp-canceling and postmarking-machines, the object being to produce a mechanism which is simple in construction and positive, durable, rapid, and automatic in operation.

To this end the invention consists in a marking-die-carrying roller and a pressure-roller, one of which is movable away from and toward the other for preventing smearing of the parts when no letter is passing and a contact-piece arranged to make contact with the mail-matter and prevent the separation of the rollers when a letter is passing, so that the letter may be marked.

The invention also consists in a yielding bearing for one of said rollers, a cam for the other, a movable rod on the yielding bearing, a stop for engaging the rod, and connections between said contact-piece and stop.

It furthermore consists in the feeding mechanism for feeding the letters to the marking and pressure rollers and in the detail construction and arrangement of the parts, all as hereinafter more particularly described, and pointed out in the claims.

In specifying my invention reference is had to the accompanying drawings, forming a part of this specification, in which like characters indicate corresponding parts in all the views.

Fig. 2ª is a longitudinal vertical section of the sliding rod and adjacent parts, taken on line *x x* in Fig. 2. Fig. 10 is a top plan, and Fig. 11 a side elevation, of a modified form of mail-marking and feeding mechanism embodying my invention, while Fig. 12 is a detail view thereof.

A represents the frame, and B B the legs, of my improved marking-machine, both of which are of any suitable form, size, or construction.

The primary actuating device consists of a treadle C and a connecting-rod pivoted to the crank of the shaft H, that carries the balance-wheel D and the pulley E.

F is the driving-belt for transmitting motion from the pulley E to the sections of the tight and loose pulley E' on the shaft *s* to permit the stoppage of the shaft *s* when the shifter S moves the belt upon the loose section of said tight and loose pulley E'.

Mounted upon the main frame A of the machine is a table or frame A', which forms a support for the marking-roller and the actuating means for postmarking letters and other traveling mail-matter and canceling the stamps thereon.

Figure 4:
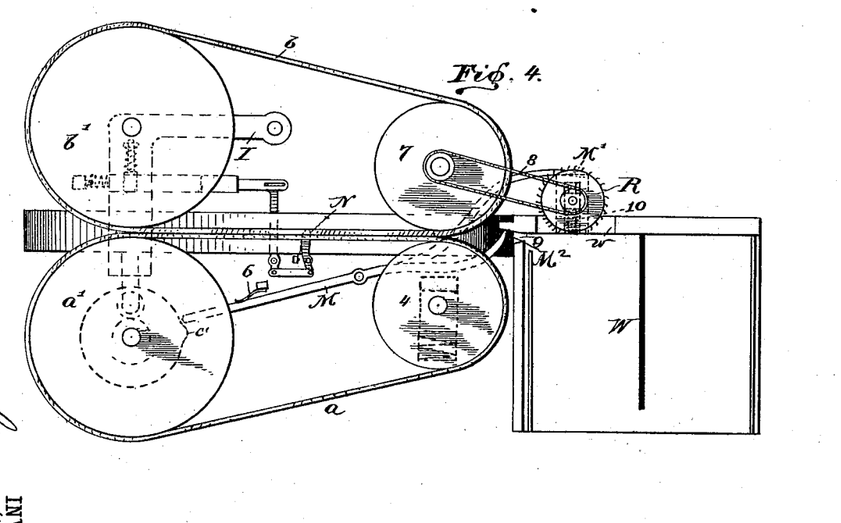
Fig. 4 illustrates a top plan of the marking and mail-feeding mechanism, illustrating more particularly the arrangement of the separating devices for feeding the mail-matter forward consecutively, the feed-rollers next to the separator being in their normal position.

$a'$ is the marking-roller, and $b'$ the pressure-roller or platen, one of which, preferably the pressure-roller $b'$, is movable away from and toward the other, being journaled in an oscillating or yielding frame I and adapted to carry a belt $b$, which passes around and drives the drum 7, Fig. 4. A bent spring O, secured to the table A', bears against the yoke I for yieldingly holding the pressure-roller $b'$ against the marking-roller $a'$.

Figure 1:
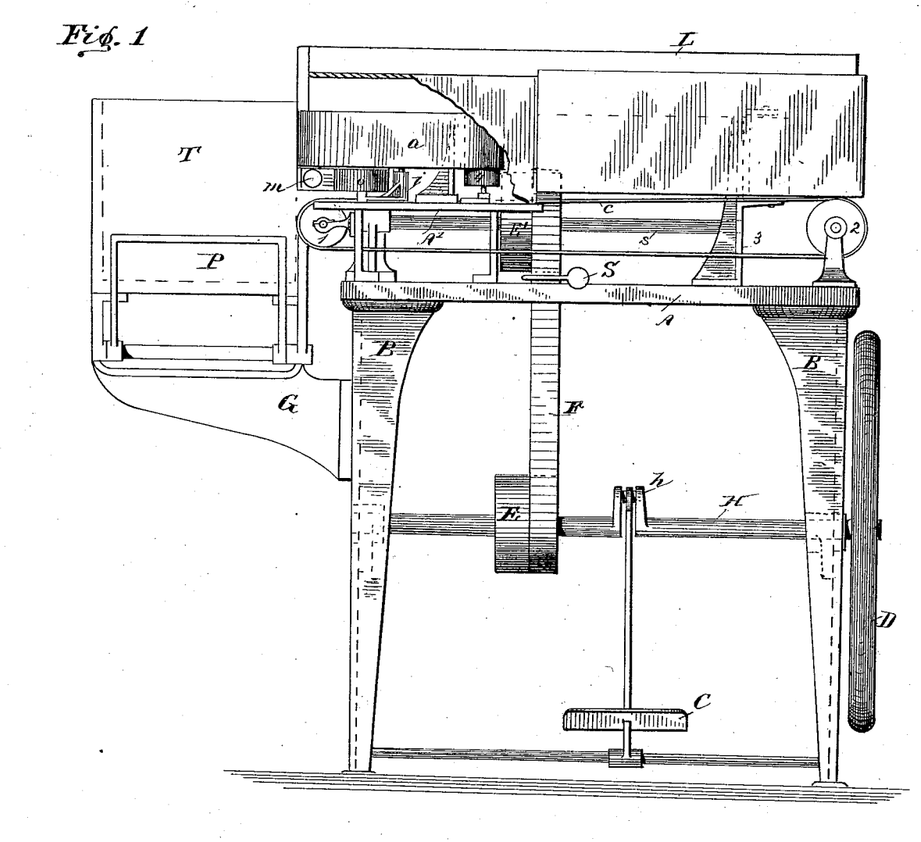
Figure 1 is a side elevation illustrating the general construction and arrangement of the machine, a portion of the side frame being broken away to show the marking-roller.
Figure 5:
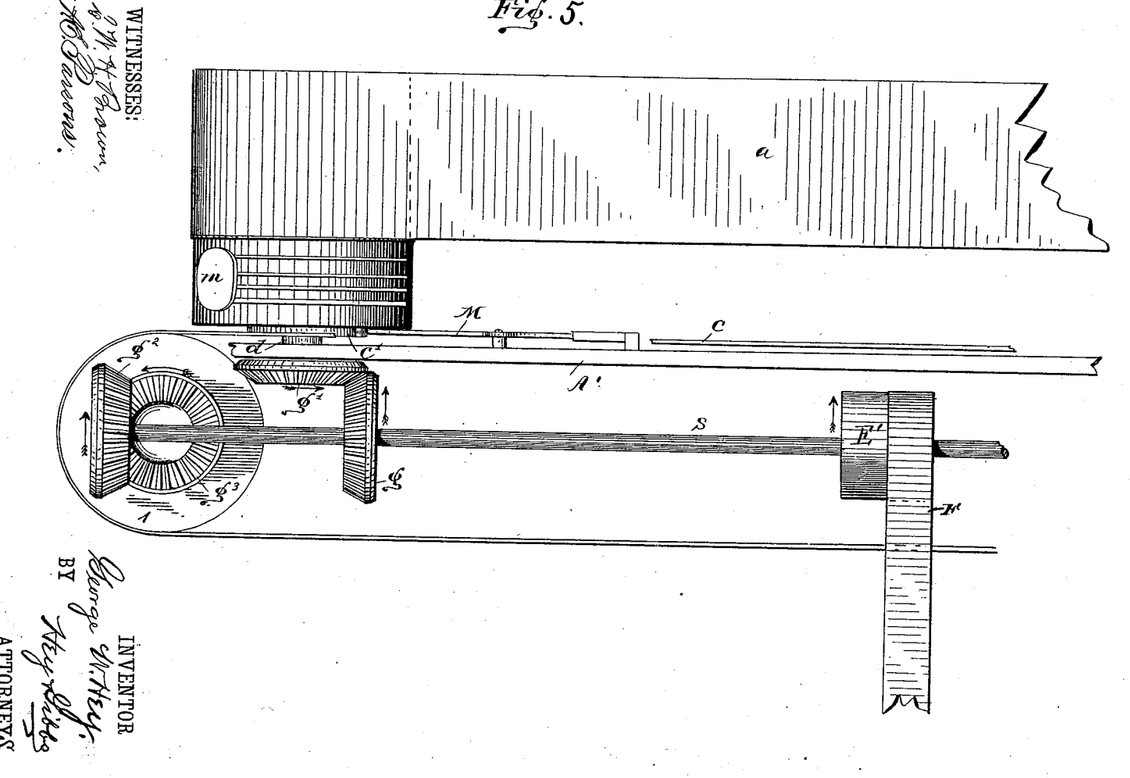
Fig. 5 is an enlarged side elevation of the marking-roller and the gearing on the main shaft of the machine which transmits motion to the marking-roller and rotates the same positively.
Figures 6, 7:
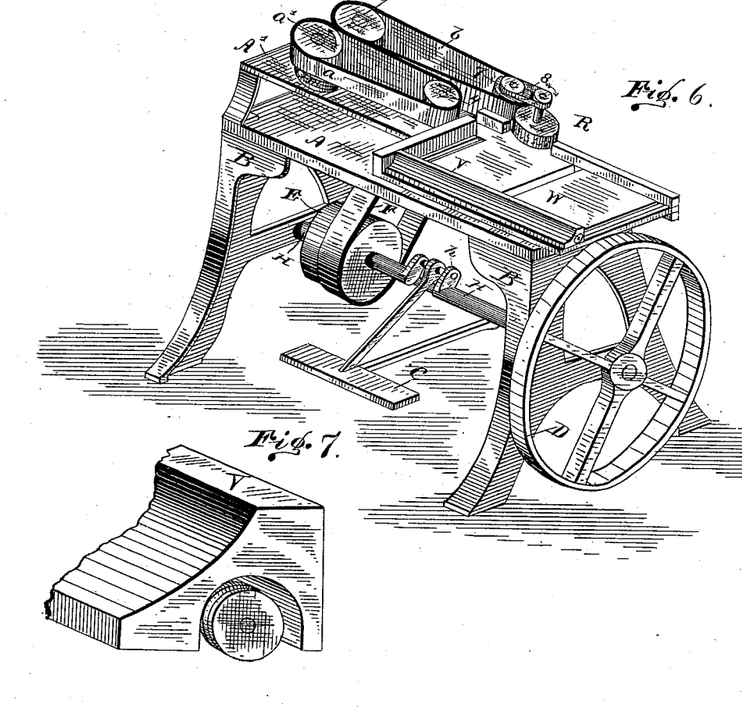
Fig. 6 is a perspective view of my improved stamp-canceling and postmarking machine, illustrating the general arrangement of the parts as assembled for use.
Fig. 7 is an enlarged detached view of the follower for feeding the mail to the feed or separating roller, which is operated by the marking-roller through the medium of the timing-lever.

At one extremity of the marking or printing roller $a'$ is the marking-die $m$, Fig. 5, which is inked from the roller $o$, Fig. 1, and at the other extremity is the belt $a$, which passes around the drum 4. This drum 4 is mounted in yielding bearings (shown by dotted lines at Fig. 4) for permitting the drum to yield to letters of different thicknesses. It will be particularly noted that the belts $a$ and $b$ are of unequal width, the belt $a$ being the narrower and arranged with its lower edge above the marking-die to expose a portion of the mail-matter to the action of the die.

The marking-roller $a'$ is driven positively and rotates continuously. The preferable means for rotating the marking-roller is illustrated in the enlarged view, Fig. 5, and consists of the bevel-gear $g$ on the shaft $s$, which meshes with a gear $g'$, secured to the journal of the marking-roller. The pressure-roller $b'$ turns by frictional contact with the marking-roller $a'$, as best shown in the enlarged plan views, Figs. 2 and 3, until the marking-die $m$ comes in close proximity to the periphery of the pressure-roller, whereupon if no letter or other mail-matter is passing the pressure-roller is to prevent smearing of the parts forced from contact with the marking-roller by mechanism immediately described. On the contrary, if a letter is passing between the rollers $a'$ $b'$ the pressure-roller remains in its position adjacent to the marking-roller and forms a support or platen for the letters when being stamped by the marking-roller, thus rendering the mark clear and defined.

Figure 2:
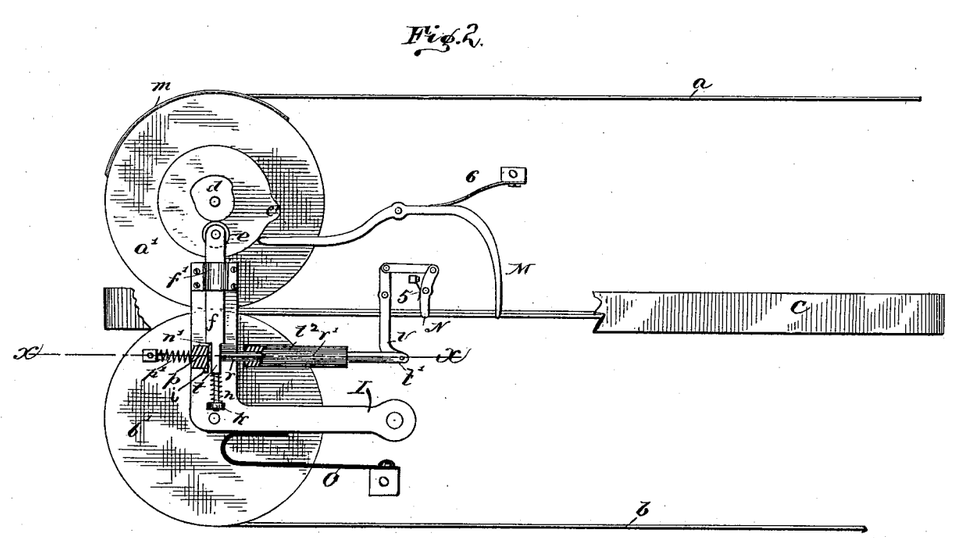
Fig. 2 is an enlarged inverted bottom plan of the marking-roller and pressure-roller, illustrating the detail construction and arrangement of the timing device for controlling the action of the marking and pressure rollers.
Figure 2A:
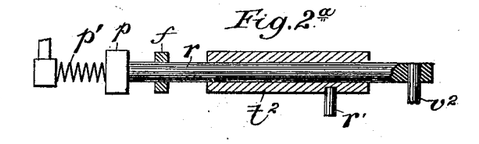
Figures 8, 9:
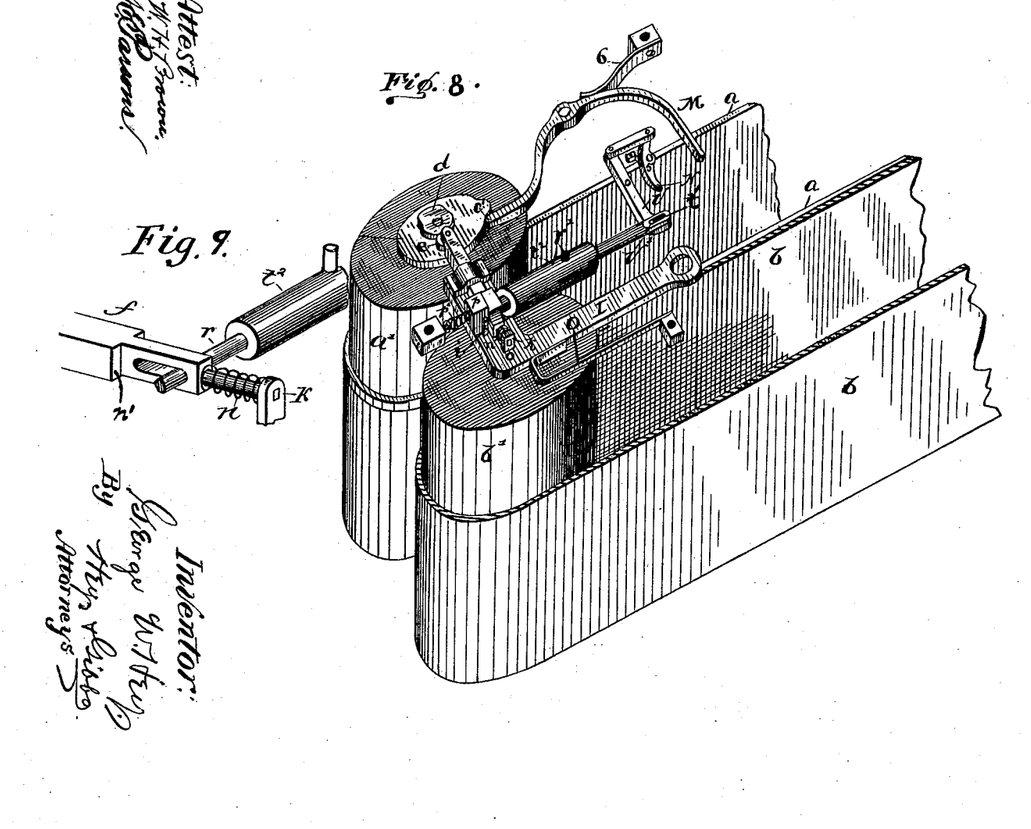
Fig. 8 is an enlarged inverted perspective view of the mechanism for operating the pressure-roller by the mail-matter for bringing the marking-roller into action.
Fig. 9 is an enlarged detached detail view of the sliding rod which carries the block for releasing the rod which causes the pressure-roller to oscillate to and from the marking-roller.

The yoke I of the pressure-roller is provided with bearings $f'$ and $k$, in which is movable a bar or rod $f$. One extremity, Fig. 2, of the rod $f$ is provided with the friction-roller $e$ and the other with the spiral $n$, which serves to force the rod $f$ toward the marking-roller with a constant pressure. The yoke I, as shown in Figs. 2 and 8, is also provided with an abutment $i$, in the shape of a pin, stud, or shoulder, located in the path of the locking or stop block $p$, to be described. This friction-roller $e$ in the extremity of the rod $f$ is in constant contact with the cam $d$ on the shaft of the marking-roller $a'$, and the cam $d$ and rod $f$ serve, in connection with the abutment $i$ and locking or stop block $p$, as a means or connection for forcing the pressure-roller $b'$ from the marking-roller $a'$ when no letter is passing and the die $m$ is approaching the periphery of the pressure-roller $b'$. The locking or stop block $p$ is connected to or mounted upon the rod $r$, Fig. 2, which passes through a tubular bearing $t^2$, pivoted to the table A' at $r'$, and through a slot in the rod $f$, Fig. 9, for conforming to the movement of the pressure-roller frame or yoke I. The spiral $p'$, secured to the table A', serves to normally press the locking-block $p$ into engagement with the shoulder $n'$ of the rod $f$. The locking or stop block $p$ is also connected with the yoke I, so as to move therewith, by the aforesaid abutment $i$ or in any other suitable way which permits its movement across said yoke, so as to clear the shoulder $n'$ of the rod $f$.

It will be observed that the movable rod $r$, carrying the locking or stop block $p$, slides lengthwise in the tubular bearing $t^2$, and this movement is utilized to disengage said block $p$ from the shoulder $n'$ of the rod $f$. When the shoulder $n'$ of the rod $f$ is engaged with the locking-block $p$, it is apparent that as the cam $d$ rotates against the friction-roller $e$ the yoke I and the pressure-roller $b'$, journaled therein, are forced away from the marking-roller $a'$ by the locking-block and connections just described. This cam $d$ is radial and so arranged with the marking-die $m$ that the pressure-roller $b'$ is forced away from the marking-roller $a'$ when no letter is present at about the time the marking-die $m$ comes in proximity to the periphery of the pressure-roller $b'$, thus preventing the impression-die from smearing the periphery of the pressure-roller $b'$, or, more strictly speaking, the belt thereupon, and consequently the back of the succeeding letter is not smeared as the letter is fed past the marking and pressure rollers.

In order to mark a letter, it is essential that the pressure-roller $b'$ shall remain against the marking-roller $a'$ or rather against the letter fed between the two rollers, so as to exert its pressure when the die is rotating against the letter. Hence it is necessary to connect the movable rod $r$ with means in the letter-path, whereby the locking block or stop $p$ may be disengaged from the shoulder $n'$, and thereby prevent the movement of the pressure-roller from the letter-path while the letter is passing. The means for securing this result consists in a lever $v$, pivoted to the table A and connected at one end to the sliding rod $r$ by a stud-pin $v'$ and connected at the other by a link connection to a contact-piece or trigger N. A spring 5, Fig. 2, exerts a pressure on the trigger N and serves to keep it normally in the path of the letter for making contact therewith, and a slot $t'$ in the rod $r$ allows the trigger N to assume its normal position after the advancing piece of mail passes said trigger. When the letter is fed between the belts $a$ $b$, it encounters the trigger N and rocks the same. The movement of the trigger crowds forward the pin $v'$ on the lever $v$, which carries with it the rod $r$, and the locking-block $p$, thus disengaging the shoulder $n'$ of the rod $f$ from its engagement with the block $p$. Consequently the rod $f$ is forced outward by the cam $d$ as the marking-roller rotates without forcing away the pressure-roller $b'$, which therefore remains against the marking-roller $a'$, exerts its pressure on the letter at the proper time, and supports it during the operation of marking the letter. As soon as the rod $f$ is allowed to resume its normal position under the influence of spring $n$ the block $p$ and its rod $r$, being released, are by the spring $p'$ thrown back to their initial position, thereby resetting the trigger N to its normal position in the path of the letter and causing the block $p$ to again engage the shoulder $n'$. The parts are now all in their original positions and ready for a second operation—that is to say, to either force the pressure-roller away from the inked portion or marker $m$ of the marking-roller when no letter is passing or to trip the mechanism so as to hold the pressure-roller against the marking-roller during the entire revolution of the latter when a letter is passing. The spring $5$ serves as an auxiliary to aid the spring $p'$ in restoring the trigger and the mechanism connected therewith to their normal positions and might under some circumstances be dispensed with. It will be observed that the tension exerted by the spiral $p'$ on the locking-block $p$ and the rod $r$ has a constant tendency to force the block or stop $p$ toward its seat against the shoulder of the sliding rod $f$ and that as soon as the cam $d$ passes out of contact with the friction-roller $e$, allowing the rod $f$ to resume its normal position, the block $p$ engages the shoulder on the rod $f$, and unless the contact-piece or trigger is again rocked the pressure-roller is forced away from contact with the marking-die $m$, as previously explained.

In treating the operation of the marking-roller thus far I have described its operation upon a letter without regard to the means for locating the mark, which is essential when it is desired to cancel the stamp. To accomplish this desirable result, I provide a cam $c'$, secured to the journal of the marking-roller $a'$, Figs. 2 and 4, and a timing-lever M, pivoted to the table $A'$ and forced to its normal position by a spring 6. One end of the lever M lies normally in the path of the cam $c'$ and the other normally in the letter-path. When the marking-die $m$ is in the proper position to imprint on the letter the cancellation and postmark, the cam $c'$ forces the timing-lever M out of the path of the letter, so that the same has free passage to the contact-piece or trigger N, which lies in the path, as previously described, and the letter is properly marked without stoppage in transit to the marker, as hereinbefore described. On the contrary, if the die $m$ is in the position indicated in Fig. 2 the letter encounters the extremity of the timing-lever M, which now lies in the letter-path, and is temporarily stopped until the cam $c'$ collides with the opposite extremity of the lever M, and thus removes the timing-lever M from the path of the letter and permits its onward movement to the marking and pressure rollers, where it is properly marked. It will be understood that the travel of the letter from the stop end of the timing-lever M to the die is timed, and the cam $c'$ is also timed so as to remove the lever M from the path of the letter at the proper moment to commence the impression on the letter from the advancing end thereof.

The primary feeding device consists of the belts $a$ and $b$, previously described, and the horizontal belt $c$, Figs. 1, 2, and 5, which is preferably driven by the gear $g^2$, that meshes with the bevel-gear $g^3$, secured to the shaft of the forward drum 1 of the horizontal belt $c$. These belts $a$ and $b$ are arranged vertically in relation to the belt $c$, and the three belts together form a moving support for the traveling mail-matter, which carries the same forward to the marking and pressure rollers.

While the three belts $a$, $b$, and $c$ form what I consider the preferable form of carrying this portion of my invention into effect, it is apparent that the third belt $c$ may be dispensed with and replaced by some other form of horizontal support for the edges of the letters. In some instances no such support might be necessary—as, for example, where the belts $a$ and $b$ are horizontal, so as to carry the letters to the marking devices in a horizontal instead of a vertical position.

It will be observed that the pressure-roller $b'$ is driven by frictional contact with the positively-rotating marking-roller $a'$ and that the pressure-roller $b'$, with its belt $b$, does not rotate constantly, for the reason that when no letters are passing the marking-roller $a'$ the roller $b'$ is forced away from the roller $a'$ by means of the mechanism described and for the further reason that the roller 4 is held against the roller 7 with a very slight pressure, so that whenever the rollers $a'$ and $b'$ are separated the friction between the belts $a$ and $b$ will not be sufficient to cause the belt $a$ to carry the belt $b$ with it. Consequently at the moment when the roller $b'$ is held off of the periphery of the roller $a'$ it stops turning and starts again when it comes in contact with the roller $a'$.

The secondary feeding device consists, essentially, of the separator-roller R, the letter-hopper W, and the follower operated by the cord $y$ and weight $x$. The hopper W, which is sufficiently large to hold fifty to one hundred letters, is provided with ways upon which the angular follower has a rectilinear movement transversely across the frame of the machine. Attached at one extremity to the letter-follower is a cord $y$, having its other end passed over a pulley $z$ and connected to a weight $x$, that serves to draw the follower toward the opposite side of the hopper W and against the separator-roller R, which feeds the letters one at a time from the hopper W. The separator-roller R is journaled in a suitable bearing and is held normally yieldingly away from an aperture $w$ in the side of the hopper, as shown in Fig. 4. The separator-roller R is rotated by a belt 8, Fig. 4, and its periphery is provided with a frictionally-engaging face, as needle-pointed teeth, which, as immediately described, engage the letters and feed them forward. In the embodiment of my invention illustrated in Fig. 4 the timing-lever M is provided with a fork-shaped extremity, one prong of which bears at M' against the feeding or separator roller bearing, and as the cam $c'$ on the marking-roller $a'$ rocks the lever M to withdraw the opposite arm or prong $M^2$ of its bifurcated extremity from the letter-path the separator-roller R is forced into the aperture $w$ in the side of the hopper W, whereupon its needle-pointed teeth engage the letter forced thereagainst by the action of the follower V, previously described, and feeds the same through the exit 9 in the forward side of the hopper, whence it is carried between the drums 4 and 7 onward to the marking-roller and is then marked as previously described. By referring to Fig. 12 it will be observed that the arm or prong M' of the timing-lever is attached to the yielding journal-box R' of the feeding or separating roller R, the said journal-bearing being guided in a slotted frame B' and yieldingly urged away from the hopper W by a spring 10.

Figure 3:
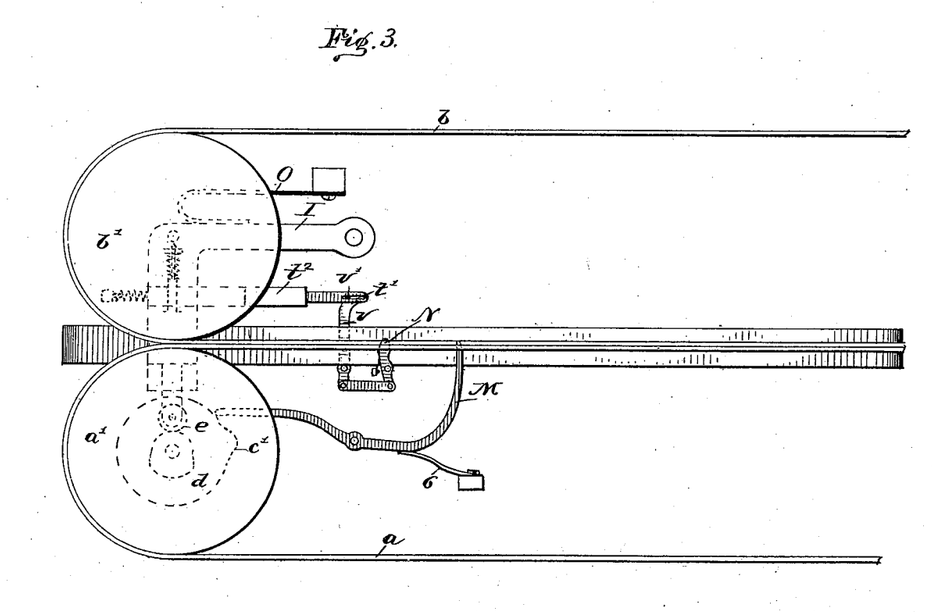
Fig. 3 is an enlarged top plan of the parts illustrated in Fig. 2.

The construction of separating-roller R described is sometimes dispensed with, and in that case the timing-lever does not communicate motion to the separator, being then formed without a bifurcated extremity, as shown at Figs. 2, 3, and 8.

I also preferably employ in connection with the mechanism a tray T, Fig. 1, and a packer P for stacking the letters after they come from between the marking and pressure rollers. Instead of using the hopper and feed just described the mail-matter may be fed by hand to the belts $a$, $b$, and $c$, and when thus fed a facing-table L, Fig. 1, may be employed.

The operation of my marking-machine will be readily understood from the foregoing description and upon a consideration of the drawings. The marking-roller rotates constantly and normally in the path of the letter and is journaled in fixed bearings, while the pressure-roller is supported in yielding bearings and is moved toward and away from the marking-roller by the separating mechanism when no letter is passing. The smearing of the pressure-roller is thus prevented. When a letter is passing, the separating mechanism is rendered inoperative by the engagement of the contact-piece and letter, and the rollers remain in contact and mark the letter. Thus it will be observed that the rollers are mechanically separated when no mail-matter is present, and are controlled by the mail-matter through the medium of the connections to remain in contact, so that the passing mail-matter virtually establishes the marking condition of the rollers.

The herein-described means for effecting the separation of the marking and pressure rollers and controlling their action through the medium of the passing letter or other mail-matter is very applicable for producing the desired result; but it is evident that the contact-piece and intermediate separating mechanism may be connected to the rollers in other ways to effect this result. I do not therefore limit myself to the particular form and construction of these parts nor to their particular connection with the rollers.

Figures 10, 11, 12:
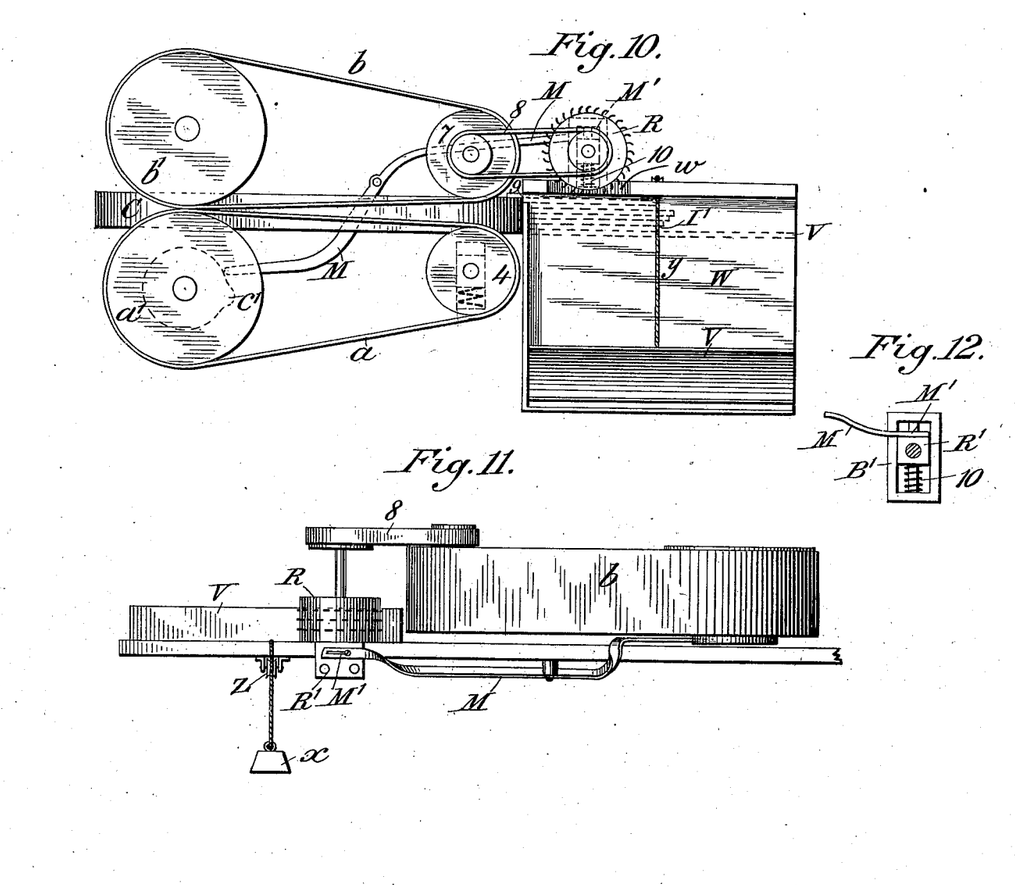
Figure 13:
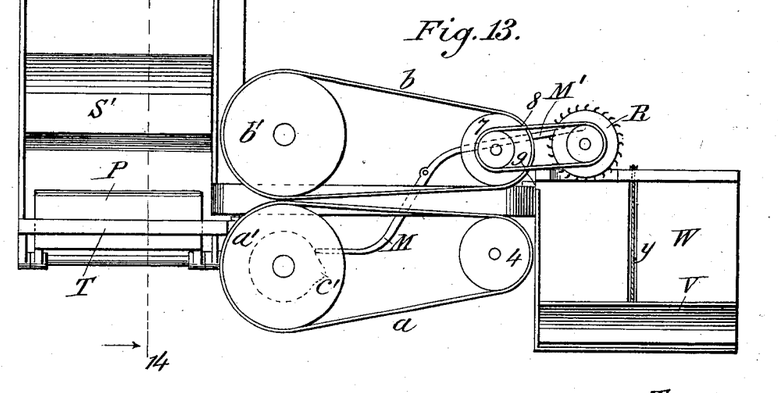
Fig. 13 represents a plan view of the machine, showing the feeding-table, the mail-marking mechanism, and the tray or mail-stacking table in position.
Figure 14:
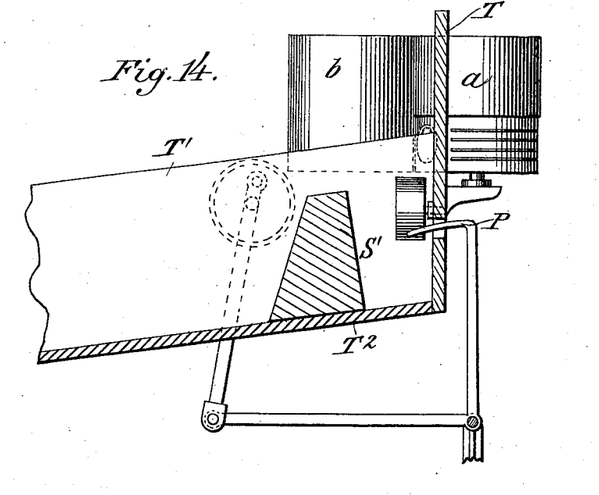
Fig. 14, a transverse vertical section on the line 14 14, Fig. 13.

The secondary feeding device, consisting of the feeding mechanism described, controlled from the marking device, so as to actuate said feeding device at such intervals as to feed the letters one by one in proper relation to the marking device, and in its present embodiment consisting, as shown at Fig. 4, of a separating or feeding roller R, connected with a timing-lever and a cam or other part on the marking-roller $a'$ for moving the timing-lever, so as to force the feeding-roller into contact with the letters, is a desirable and very useful feature in connection with either the prong or stop-arm $M^2$ of the timing-lever or with the intermittently-separable marking and pressure rollers in combination with the trigger N or other device for tripping the rollers, so as to remain in contact during their entire revolution or with both. However, this feeding mechanism may, if properly located, be used independently of the prong or stop $M^2$ and of such intermittently-separable marking and impression rollers combined with the trigger N, and by its use the intermittent separation of the said rollers may be dispensed with. An arrangement of this character is illustrated in Figs. 10 and 11, in which $a'$ and $b'$ represent the marking and pressure rollers, respectively, which revolve in constant contact with each other, and hence dispense with the mechanism for intermittently separating one roller from the other and with the trigger in the latter path and intermediate connections for causing the rollers to be tripped, so as to remain in contact throughout an entire revolution whenever a letter passes. The letter-hopper W is in this instance placed at such a distance from the printing-roller that the letters as they are separated one by one and fed from the hopper W will reach the marking-die just in time to be printed upon and to prevent the same from smearing or offsetting on the belt $b'$ of the pressure-roller. In this case the wall of the hopper nearest to the letter-exit 9 serves as a stop or abutment against which the advanced ends of the letters are evened, and the timing-lever M, which, as indicated in Fig. 12, is connected at M' to the yielding journal-box R' of the feeding-roller R, is operated by the cam c' or other part connected to the marking-roller a' at the proper time to force the feeding-roller against the letters in the hopper W. Under this construction a letter fed in hopper W is separated and fed forward at each revolution of the marking-roller in time to be marked at the proper point by the die on the marking-roller and to prevent the said die from offsetting onto the belt b. I, however, prefer the construction represented in Fig. 4, where the separating or feeding roller is combined with the intermittently-separable rollers a' b', and the contact-piece N, in the letter-path, arranged and connected as described, and also with the prong or letter-stop M² for properly timing the passage of the mail-matter to the marking-die.

Having thus fully described my invention, what I claim as new, and desire to secure by Letters Patent, is—

1. The combination with a letter-feeder, of a marking-roller, and an impression-roller, one of which is yieldingly mounted against the other, and means for intermittently separating them when no letter is passing, and a device in the letter-path operated by the passing letter to render such separating means inoperative.

2. The combination, of a continuously and positively rotating marking-roller, and a pressure-roller mounted in a frame movable with respect to the marking-roller, with an intermittently-acting separating device between the marking-roller and the frame carrying the pressure-roller, means for locking the separating device, and means for releasing the locking device, substantially as and for the purposes described.

3. The combination, of a marking-roller and a pressure-roller yieldingly held against the marking-roller, with an intermittently-acting separating device between the marking and pressure rollers, means for locking the separating device, and a trigger arranged in the letter-path and connected with said means for locking, whereby the locking means are released and the intermittent separation of the marking and pressure rollers is suspended whenever a letter engages with the trigger, substantially as described.

4. The combination with a marking-roller and an impression-roller, one of which is yieldingly mounted relatively to the other, of means for intermittently separating them, means for rendering such separating means inoperative, a letter-feeder, and a movable letter-timing stop operated by means on one of said rollers.

5. The combination of a marking-roller, and a yieldingly-mounted impression-roller, with a cam on the marking-roller, a connection between the cam and impression-roller support whereby the impression-roller is separated from the marking-roller during a part of its revolution, when no letter is passing, and means for breaking the connection when a letter is passing.

6. The combination, of a continuously and positively rotating marking-roller, and a pressure-roller mounted in a frame movable with respect to the marking-roller and rotating by contact with the same, with a cam mounted on the shaft of the marking-roller, and a connection interposed between the said cam and the frame of the pressure-roller, whereby the latter is separated from the marking-roller during a part of its revolution, when no letter is passing, and means, arranged in the letter-path, for breaking the said connection whenever a letter passes, substantially as set forth.

7. The combination with a letter-feeder, of a letter-timing stop intermittently movable in the letter-path, a marking-roller provided with means for moving the letter-timing stop, a yieldingly-mounted impression-roller, means for separating the marking and impression rollers during a part of their revolution when no letter is present, and a device for rendering the separating means inoperative when a letter is in position to be marked.

8. The combination, of a support for mail-matter while being marked, a marking-roller, and a pressure-roller mounted in a movable frame, with an intermittently-acting separating device between the marking-roller and the movable frame, a locking device for said separating device, and a trigger projecting into the letter-path and connected with the locking device, whereby the locking device is released and the intermittent separation of the marking and pressure rollers is suspended whenever a letter engages with the trigger, substantially as set forth.

9. The combination, of a marking-roller and a cam on its shaft, with a pressure-roller mounted in a yielding frame, a movable rod mounted in the yielding frame and bearing against said cam, a locking device for locking the movable rod to the yielding frame, and a trigger in the letter-path connected with the means for locking the movable rod, substantially as and for the purpose set forth.

10. The combination, with a marking-roller, and a cam on its shaft, of a pressure-roller mounted in a movable yoke, a movable rod attached to the yoke and bearing against the cam on the marking-roller, a locking-block normally in contact with the movable rod for locking it detachably to the roller-yoke, and a contact-piece in the letter-path connected to the locking-block by means, substantially as described, whereby the sliding block is disengaged by a letter colliding with the contact-piece, substantially as and for the purpose set forth.

11. A feed mechanism comprising a feed-roller in combination with a marking-roller, an impression-roller and a mail-matter-timing stop, of suitable connecting mechanism operated by one of said rollers for controlling the marking of the mail-matter and preventing the smearing of the impression-roller when no mail-matter is present.

12. The combination with a marking-roller and an impression-roller, of a yielding bearing for one of said rollers, a cam on the other roller, a movable rod on the yielding bearing acting in conjunction with said cam, a stop for engaging the rod, a contact-piece, and connections between said contact-piece and stop.

13. The combination, with a marking-roller and a pressure-roller, one of which is mounted in a movable frame, of a movable rod mounted in the movable frame, a part on the other roller for intermittently acting against the movable rod, a stop or locking block to lock the movable rod to the movable frame, and a trigger or contact-piece in the letter-path and connected to the stop or locking block, substantially as and for the purpose set forth.

14. The combination, with a marking-roller and a pressure-roller, one of which is mounted in a movable frame, and belts for feeding the mail-matter to the marking-roller, one of said belts having its lower edge arranged to expose a portion of the letter to the action of the marking-roller, of a movable rod mounted in the movable frame, a part on the other roller for intermittently acting against the movable rod, a stop or locking block to lock the movable rod to the movable frame, and a trigger or contact-piece in the letter-path and connected to the stop or locking block, substantially as and for the purpose set forth.

15. The combination, with a revolving marking-roller, and a pressure-roller carried by a movable frame, of an intermittently-acting separating device between the marking-roller and the frame carrying the pressure-roller, means for locking the separating device, and a trigger or contact device extending into the letter-path and connected to the means for locking the separating device, whereby the passing mail-matter prevents the outward movement of the pressure-roller, substantially as and for the purpose set forth.

16. The combination, with the marking-roller and movable pressure-roller, of devices for moving the latter to and from the former, a trigger or contact-piece, and connections whereby the movement of the trigger by the mail-matter prevents the outward movement of the pressure-roller, substantially as and for the purpose set forth.

17. The combination, of a marking-roller rotating in fixed bearings, and a pressure-roller journaled in a yielding bearing, with a cam on the shaft of one of said rollers, a movable rod mounted in the yielding bearing and bearing against the cam, a device for locking the movable rod to the yielding bearing, and a trigger or contact-piece extending into the letter-path and connected to the locking device, to trip the movable rod whenever a letter passes, and cause the pressure-roller to bear against the marking-roller throughout an entire revolution, substantially as and for the purpose set forth.

18. The combination, of a movable yoke, I, carrying a pressure-roller and having a sliding rod, $f$, mounted in bearings thereon, and a friction-roller on the rod, $f$, with a cam, $d$, on the marking-roller shaft, a rod, $r$, carrying a stop-block, $p$, a pin, $i$, on the movable yoke, and a contact-piece, N, connected to the rod, $r$, by the levers, $v$, substantially as and for the purpose set forth.

19. The combination, of a marking-roller and a pressure-roller, a separating device for intermittently moving one of said rollers away from the other, and a locking device for said separating device, with a trigger or contact-piece arranged to make contact with the mail-matter, and connected with the locking device so as to release the same, and a timing-lever for preventing the passage of the mail-matter to the contact-piece until the proper moment, substantially as and for the purpose set forth.

20. The combination of a marking-roller and a pressure-roller, a separating device for intermittently moving one of said rollers away from the other, and a locking device for said separating device, with a trigger or contact-piece arranged to make contact with the mail-matter, and connected with the locking device so as to release the same, and a separator for feeding the letters one by one to the contact-piece, substantially as and for the purpose set forth.

21. The combination of the following parts: a marking-roller, $a'$, journaled in fixed bearings and having cams, $c'$, $d$, on its shaft, a yieldingly-journaled pressure-roller, $b'$, having a sliding rod, $f$, adapted to bear against the cam, $d$, the rod, $r$, having block, $p$, the pin, $i$, the springs, $n$, $p'$, the trigger, N, connections between the trigger and the rod, $r$, and a timing-lever, M, substantially as and for the purpose set forth.

22. The combination, of the marking and pressure rollers mounted in yielding contact with each other, and means for separating said rollers, with feed-belts, $a$, $b$, revolving on rollers, $a'$, 4, and $b'$, 7, the belt, $c$, the timing-lever, M, operated by a cam on the marking-roller shaft, and mechanism, substantially as described, for rendering the means for separating the marking and pressure rollers inoperative, substantially as set forth.

23. The combination, with a moving support, and a feed-belt above said support, of a marking-roller and a pressure-roller, a device for intermittently separating the two rollers, a stop for locking said separating device, and a contact-piece extending into the letter-path and connected to the stop, for releasing the stop whenever a letter passes, substantially as and for the purpose set forth.

24. A feed mechanism comprising a feed-roller in combination with a marking-roller, an impression-roller, and a letter-receptacle having an abutment against which the advanced ends of the mail-matter are evened, of suitable connecting mechanism between the marking and feed rollers operated by the marking-roller for timing the operation of the feed-roller, substantially as and for the purpose described.

In testimony whereof I have hereunto signed my name, in the presence of two attesting witnesses, at Syracuse, in the county of Onondaga, in the State of New York, this 27th day of May, 1887.

GEORGE W. HEY.

Witnesses:
FREDERICK H. GIBBS,
LEWIS JOHNSON.